UNITED STATES PATENT OFFICE.

WILHELM E. KEMMERICH, OF MULHEIM-ON-THE-RHINE, GERMANY.

STABILIZED OXIDIZING AGENTS.

1,101,449. Specification of Letters Patent. Patented June 23, 1914.

No Drawing. Application filed January 16, 1914. Serial No. 812,585.

*To all whom it may concern:*

Be it known that I, WILHELM E. KEMMERICH, doctor of philosophy, chemist, citizen of the German Empire, residing at Mulheim-on-the-Rhine, Germany, have invented new and useful Improvements in Stabilized Oxidizing Agents, of which the following is a specification.

Recently, the excellent property of oxygen as a destroyer of bacteria and as a bleaching agent has led to its being used in many different ways. Hydrogen-peroxid as well as quite a number of solid oxidizing agents, the latter also in aqueous solutions, are used for the above mentioned purposes. It is well known that all these oxidizing agents are not of a stable nature and that they are decomposed in solution as well as in the dry condition, giving up the active oxygen after a short time. Owing to this disadvantage they are often rendered valueless.

The present invention relates to stabilized solutions of oxidizing agents of alkaline reaction and more particularly of sodium perborate. I have found that by the addition of a small amount of a colloid such solutions can be rendered much more stable. As colloids for this purpose can be used those of vegetable origin: as resin, tragacanth, gum arabic, or such of animal origin; as gelatin, albumen, etc., and also the synthetically prepared colloids; as viscose, nitrocellulose, etc., even if they are not soluble in water but in other fluids.

By addition of the above mentioned colloids to a solution of the oxidizing agent the stability of the products will become so improved that even after a long time only a very small quantity of oxygen will be lost. It is further possible to regulate the development of oxygen by the concentration of the colloid or the percentage of the colloid added to the solution. Even a very small amount of a colloid improves the stability, so that the active oxygen can be used in a much better way than it has been hitherto possible. As an example:—After allowing a 2 per cent. solution of perborate of sodium to stand for five days under the same conditions with only 0.1 per cent. of gelatin, it was noticed that only one fifth of the amount of oxygen was lost as would have been without gelatin.

The stabilized solutions of the present invention are of particular value for use in bleaching. The oxygen is set free more slowly and evenly even at higher temperatures and it becomes possible to make use of all the oxidizing agent, with particularly advantageous results, since the bleaching action is more uniform and the material being bleached less affected, the result being a more even bleaching and a correspondingly more valuable product. The colloid can be added either to the dry oxidizing agent before it is dissolved, or to the solution of such agent. Only a small amount of such colloid is necessary, as has been indicated. The invention is of particular value in connection with those solid oxidizing agents such as sodium peroxid and perborate which in solution give an alkaline reaction.

I claim as my invention:—

1. As a new article of manufacture a stabilized solution of sodium perborate containing about 2% of sodium perborate and a small amount of a stabilizing colloid.

2. As a new article of manufacture a stabilized solution containing about 2% of sodium perborate and about 0.1% of gelatin.

In testimony whereof I have hereunto set my hand in the presence of two subscribing witnesses.

DR. WILHELM E. KEMMERICH.

Witnesses:
ELLIS SCHNIER,
ENGELBERT VALENTINE.